United States Patent
Prabhu et al.

(10) Patent No.: US 8,166,260 B2
(45) Date of Patent: Apr. 24, 2012

(54) METHOD AND SYSTEM FOR MANAGING INACTIVE SNAPSHOT BLOCKS

(75) Inventors: Vasantha Prabhu, Bangalore (IN); Rushi S. Surla, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 550 days.

(21) Appl. No.: 12/105,523

(22) Filed: Apr. 18, 2008

(65) Prior Publication Data

US 2009/0265516 A1    Oct. 22, 2009

(51) Int. Cl.
*G06F 12/00* (2006.01)
*G06F 13/00* (2006.01)
*G06F 13/28* (2006.01)

(52) U.S. Cl. ........................................ 711/161

(58) Field of Classification Search .................. None
See application file for complete search history.

(56) References Cited

U.S. PATENT DOCUMENTS

| | | | |
|---|---|---|---|
| 7,409,522 B1 * | 8/2008 | Fair et al. ................... | 711/170 |
| 2004/0030727 A1 | 2/2004 | Armangau et al. | |
| 2004/0030951 A1 | 2/2004 | Armangau | |
| 2004/0107226 A1 | 6/2004 | Autrey et al. | |
| 2005/0273570 A1 | 12/2005 | DeSouter et al. | |

OTHER PUBLICATIONS

International Search Report on corresponding PCT application (PCT/US2009/040225) from International Searching Authority (USPTO) dated Jun. 2, 2009.
Written Opinion on corresponding PCT application (PCT/US2009/040225) from International Searching Authority (USPTO) dated Jun. 2, 2009.

* cited by examiner

*Primary Examiner* — Kevin Ellis
*Assistant Examiner* — Gary W Cygiel
(74) *Attorney, Agent, or Firm* — Klein, O'Neill & Singh, LLP

(57) ABSTRACT

Method and system are provided for managing inactive snapshot blocks. Information regarding inactive blocks is collected and placed in a queue. After the queue reaches a threshold number of inactive blocks, the inactive blocks are compressed and stored as a compressed segment. The compressed segment may include inactive blocks for different snapshot data structures. A compression map structure stores information regarding a plurality of compressed segments, including identifiers identifying different snapshot files which may point to one or more inactive blocks. For each compressed segment, a compression information map identifies the location of each inactive block within the compressed segment and the compression state for each inactive block.

14 Claims, 11 Drawing Sheets

| Starting Physical Address of the Compressed segment | Pre-compression segment size | Post-compression segment size | Pre-compression Block Size | Snapshots whose blocks are in the compressed segment | Compression Algorithm Used |
|---|---|---|---|---|---|
| 0x3FB44530 | 1MB | 512KB | 4KB | Snap 1, Snap 2, Snap 45 | Huffman |
| 0x8A4D2730 | 1MB | 750KB | 4KB | Snap 32, Snap 54 | LZW |
| ... | ... | ... | ... | ... | ... |
| ... | ... | ... | ... | ... | ... |
| 0x9F4C8340 | 4MB | 3MB | 4KB | Snap 23 | BWT |

FIG. 6B

METHOD AND SYSTEM FOR MANAGING INACTIVE SNAPSHOT BLOCKS

BACKGROUND

1. Technical Field

The present disclosure relates to storage systems.

2. Related Art

In computer file systems for storing and retrieving information, it is sometimes advantageous to duplicate all or part of the file system. For example, one purpose for duplicating a file system is to maintain a backup copy of the file system to protect against lost information. Another purpose for duplicating a file system is to provide replicas of the data in the file system at multiple servers to share load incurred in accessing that data.

"Snapshots" are point in time copy of a file system. In some file systems, snapshot files share disk data blocks with the file system. Up on modification of a data block after a snapshot file is created, the block may no longer be shared between the snapshot file and the file system because the file system may assign a new block for the modified block. Therefore, some blocks which are used by snapshot files may not be used by the file system. These blocks may be referred to as inactive snapshot blocks. Managing inactive snapshot blocks can be challenging since they occupy storage space. It is desirable to efficiently manage inactive snapshot blocks.

SUMMARY

In one embodiment, a method and system is provided for managing inactive snapshot blocks. Information regarding inactive blocks is collected and placed in a queue. After the queue reaches a threshold number of inactive blocks, the inactive blocks are compressed and stored as a compressed segment. The compressed segment may include inactive blocks for different snapshot data structures.

A compression map structure stores information regarding a plurality of compressed segments, including identifiers identifying different snapshot files which may point to one or more inactive blocks. For each snapshot, a compression information map identifies the compression state for each block and if the block is compressed then the compression information map includes the location of each inactive block within the compressed segment.

In one embodiment, the system and techniques disclosed herein save overall storage space by compressing inactive blocks. Storage space is saved without any impact to user experience because although the inactive blocks are compressed, the active blocks remain uncompressed. Since overall storage space is saved, one can use the saved storage space to store more file data. Furthermore, because more storage space becomes available, one can take more snapshots. This is especially helpful in environments where snapshots are frequently taken, for example, in a concurrent versioning system, used for computer code development.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 6B shows an example of a compression map structure (also referred to as a "global compression map structure"), according to one embodiment;

DETAILED DESCRIPTION

Figure 1:
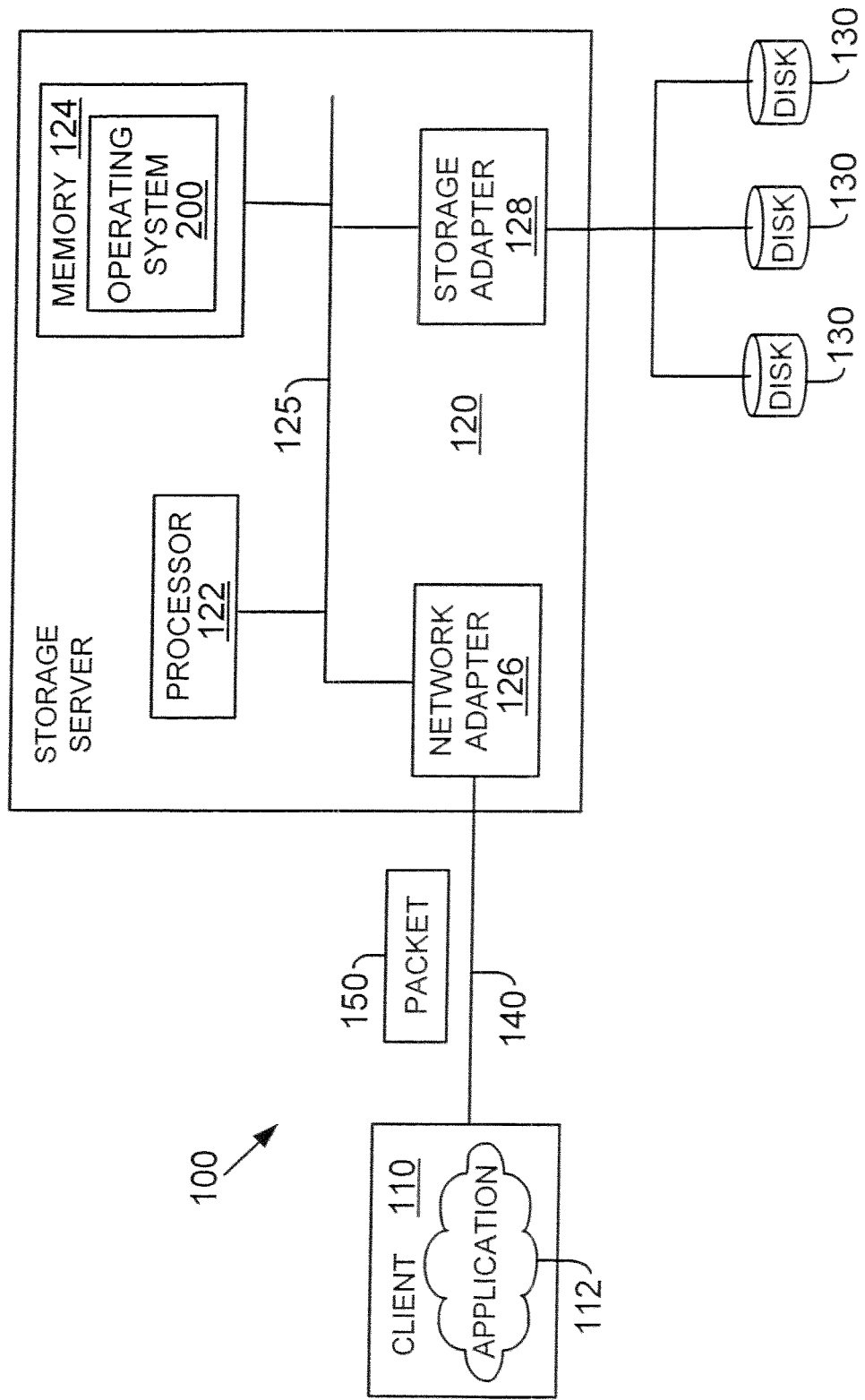
FIG. 1 shows a block diagram of a network system using the methodology of the present disclosure.

The following definitions are provided as they are typically (but not exclusively) used in a storage system, implementing the various adaptive embodiments described herein.

"Active Block" means a data block that is used by an active file system. An "active file system" is a file system to which data can both be written and read.

"Consistent": The term consistent as referred to a file system (or to storage blocks in a file system), means a set of storage blocks for that file system that includes all blocks for the data and the file structure of that file system. Thus, a consistent file system stands on its own and can be used to identify a state of the file system at any point in time.

"Inactive block" means a data block that is not being used by an active file system at a given time, i.e. a data structure for the active file system does not point to the inactive block. A snapshot data structure may point to an inactive block, even though the active file system does not point to the inactive block.

"Snapshot" means a point in time copy of a storage file system. The snapshot is a persistent point in time (PPT) image of the active file system that enables quick recovery of data after data has been corrupted, lost, or altered. Snapshots can be created by copying the data at each predetermined point in time to form a consistent image, or virtually by using a pointer to form the image of the data.

In one embodiment, a method and system is provided for managing inactive snapshot blocks (also referred to as inactive blocks). Information regarding inactive blocks is collected and placed in a queue. After the queue reaches a threshold number of inactive blocks, the inactive blocks are compressed and stored as a compressed segment. The compressed segment may include inactive blocks for different snapshot data structures.

A compression map structure stores information regarding a plurality of compressed segments, including identifiers identifying different snapshot files which may point to one or more inactive blocks. For each snapshot, a compression information map identifies the compression state for each inactive block and if the inactive block is compressed then compression information map includes the location of each compressed inactive block within the compressed segment.

To facilitate an understanding of the various embodiments of the present disclosure, the general architecture and operation of a networked storage system will first be described. The specific architecture and operation of the various embodiments will then be described with reference to the general architecture.

As used in this disclosure, the terms "component" "module", "system," and the like are intended to refer to a computer-related entity, either software, hardware, a combination of hardware and software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other device, in accordance with the claimed subject matter.

It is noteworthy that the term "file" as used throughout this specification includes a container, an object or any other storage entity.

System:

FIG. 1 is a schematic block diagram of a system 100 including a network storage appliance that may be advantageously used with the various embodiments disclosed herein. The network storage appliance or storage system (may also be referred to as storage server) 120 is a special-purpose computing system that provides various services relating to the organization of information on storage devices, for example, disks 130. However, it will be understood to those skilled in the art that the inventive embodiments described herein may apply to any type of special-purpose (e.g., server, or general-purpose computer, including a standalone computer.

It is noteworthy that the storage server, the processes and systems disclosed herein are not limited to processing file based access requests. The adaptive embodiments disclosed herein can support block based storage requests, for example, Small Computer Systems Interface (SCSI) based requests.

Storage server 120 comprises a processor 122, a memory 124, a network adapter 126 and a storage adapter 128 interconnected by a bus 125. The storage server 120 also includes an operating system 200 that implements a file system to logically organize the information as a hierarchical structure of directories and files on disks 130.

In the illustrative embodiment, memory 124 may include storage locations that are addressable by processor 122 and adapters (126 and 128) for storing software program code and data structures associated with the embodiments of the present disclosure. The processor 122 and adapters (126 and 128) may, in turn, comprise processing elements and/or logic circuitry configured to execute the software code and manipulate the data structures.

The operating system 200, portions of which is typically resident in memory and executed by the processing elements, functionally organizes storage server 120 by, inter alia, invoking storage operations in support of a file service implemented by storage server 120. It will be apparent to those skilled in the art that other processing and memory means, including various computer readable media, may be used for storing and executing program instructions pertaining to the embodiments described herein.

Network adapter 126 comprises the mechanical, electrical and signaling circuitry needed to connect storage server 120 to a client 110 over a computer network 140, which may comprise a point-to-point connection or a shared medium, such as a local area network. The client 113 may be a general-purpose computer configured to execute applications including file system protocols, such as the Common Internet File System (CIFS) protocol. Moreover, the client 110 may interact with the storage server 123 in accordance with a client/server model of information delivery. That is, the client may request the services of the storage server, and the storage server may return the results of the services requested by the client, by exchanging packets 150 encapsulating, e.g., the CIFS protocol format (or a block based format, e.g. the SCSI format) over the network 140. The format of the CIFS protocol packet exchanged over the network is well known and described in Common Internet File System (CIFS) Version: CIFS-Spec 0.9, Storage Networking Industry Association (SNIA), Draft SNIA CIFS Documentation Work Group Work-in-Progress, Revision Date: Mar. 26, 2031 (hereinafter "CIFS specification"), which is hereby incorporated by reference as though fully set forth herein. The block based SCSI format is also well known and is incorporated herein by reference in its entirety.

Storage adapter 128 cooperates with operating system 200 to access information requested by a client application (112). The information may be stored in disks 130. The storage adapter includes input/output (I/O) Interface circuitry that couples to disks 130 over an I/O interconnect arrangement, such as a conventional high-performance, Fibre Channel serial link topology. The information is retrieved by storage adapter 128 and, if necessary, processed by processor 122 (or the adapter 128 itself) prior to being forwarded over system bus 125 to network adapter 126, where the information is formatted into a packet and returned to client 110.

To facilitate access to disks 130, operating system 200 implements a file system that logically organizes the information as a hierarchical structure of directories and files on the disks. Each "on-disk" file may be implemented as set of disk blocks configured to store information, such as text, whereas a directory may be implemented as a specially formatted file in which other files and directories are stored. An example of operating system 200 is Data ONTAP™, operating system available from Network Appliance, Inc. that implements a Write Anywhere File Layout (WAFL) file system.

Figure 2:
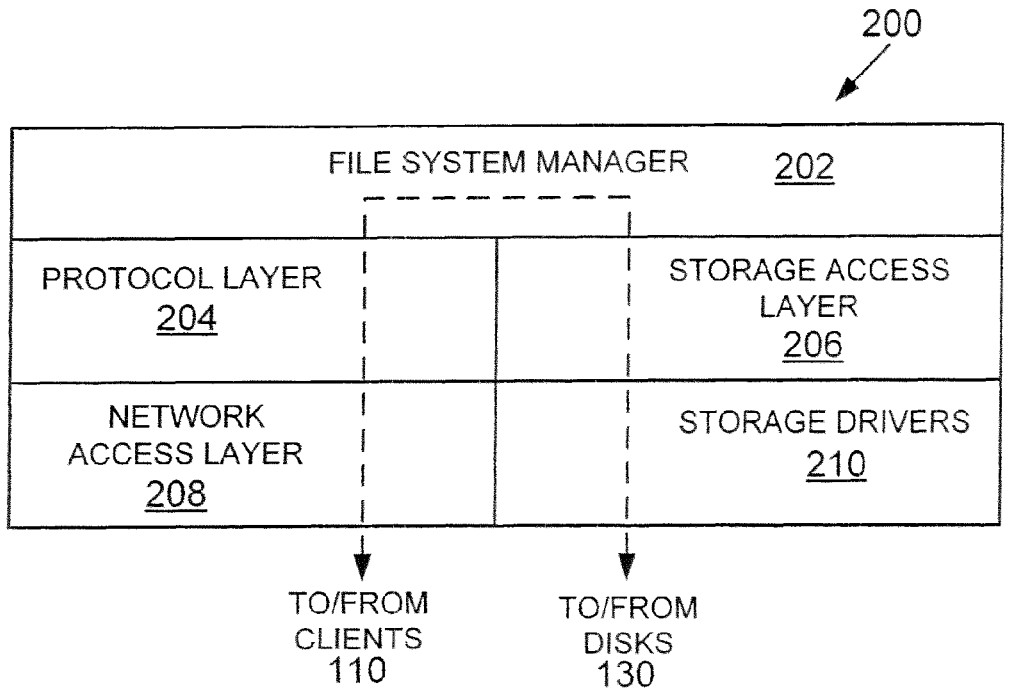
FIG. 2 shows an example of an operating system used by a storage server of FIG. 1.

Operating System Architecture:

FIG. 2 illustrates a generic example of operating system 200 for storage server 120, according to one embodiment of the present disclosure. In one example, operating system 200 may be installed on storage server 120. It is noteworthy that operating system 200 may be used in any desired environment and incorporates any one or more of the features described herein.

In one example, operating system 200 may include several modules, or "layers." These layers include a file system manager 202 that keeps track of a directory structure (hierarchy) of the data stored in a storage subsystem and manages read/write operations, i.e. executes read/write operations on disks in response to client 110 requests.

Operating system 200 may also include a protocol layer 204 and an associated network access layer 208, to allow storage server 130 to communicate over a network with other systems, such as clients 110. Protocol layer 204 may implement one or more of various higher-level network protocols, such as Network File System (NFS), Common Internet File System (CIFS), Hypertext Transfer Protocol (HTTP), Transmission Control Protocol/Internet Protocol (TCP/IP) and others.

Network access layer 208 may include one or more drivers, which implement one or more lower-level protocols to communicate over the network, such as Ethernet. Interactions between clients 110 and mass storage devices 130 (e.g. disks, etc.) are illustrated schematically as a path, which illustrates the flow of data through operating system 200.

The operating system 200 may also include a storage access layer 206 and an associated storage driver layer 210 to allow storage server 120 to communicate with a storage subsystem. The storage access layer 206 may implement a higher-level disk storage protocol, such as RAID (redundant array of inexpensive disks), while the storage driver layer 210 may implement a lower-level storage device access protocol, such as Fibre Channel Protocol (FCP) or SCSI. In one embodiment, the storage access layer 206 may implement a RAID protocol, such as RAID-4 or RAID-DP™ (RAID double parity for data protection provided by Network Appliance, Inc., the assignee of the present disclosure).

It should be noted that the software "path" through the operating system layers described above needed to perform data storage access for the client request received at the storage server may alternatively be implemented in hardware. That is, in an alternate embodiment of the invention, the storage access request data path may be implemented as logic circuitry embodied within a field programmable gate array (FPGA) or an application specific integrated circuit (ASIC). This type of hardware implementation increases the performance of the file service provided by storage server 120 in response to a file system request packet 150 issued by client 110. Moreover, in another alternate embodiment of the invention, the processing elements of network and storage adapters (126, 128) may be configured to offload some or all of the packet processing and storage access operations, respectively, from processor 122 to thereby increase the performance of the file service provided by the storage server.

In one embodiment, file system manager 202 includes a WAFL layer. The WAFL based file system is block-based, i.e. stores information on disks as blocks, for example, using, e.g., 4 kilobyte (KB) data blocks, and using inodes to describe the files. An inode is a data structure, e.g., a 128-byte structure, which may be used to store information, such as meta-data, about a file. The meta-data may include data information, e.g., ownership of the file, access permission for the file, size of the file, file type and location of the file on disk, as described below. The WAFL layer uses a file handle, i.e., an identifier that includes an inode number, to retrieve an inode from a storage disk. The WAFL layer also uses files to store meta-data describing the layout of its file system. These meta-data files include, among others, an inode file.

Figure 3:
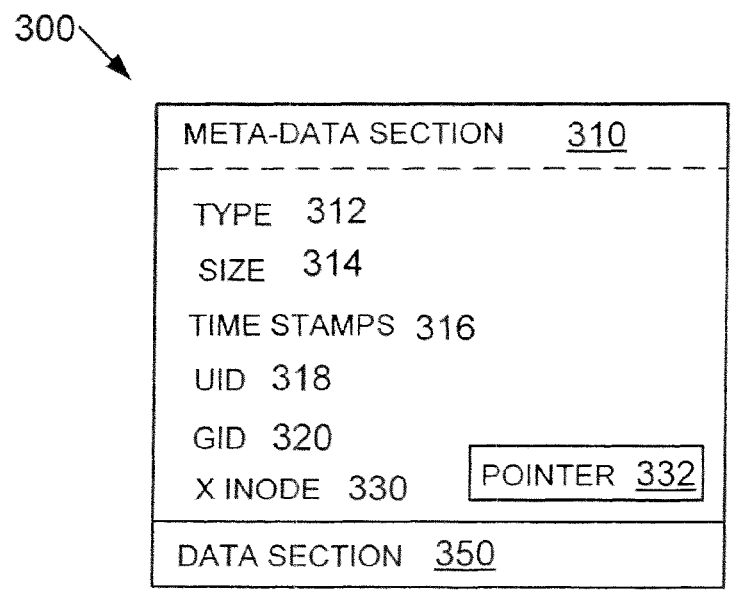
FIG. 3 shows a block diagram on an inode structure used by an operating system of a storage server.

Inode Structure:

FIG. 3 shows an example of an inode structure 330 (may also be referred to as inode 300) used according to one embodiment. Inode 300 may include a meta-data section 310 and a data section 350. The information stored in meta-data section 310 of each inode 300 describes a file and, as such, may include the file type (e.g., regular or directory) 312, size 314 of the file, time stamps (e.g., access and/or modification) 316 for the file and ownership, i.e., user identifier (UID 318) and group ID (GID 320), of the file. The metadata section 310 further includes a x-inode field 330 with a pointer 332 that references another on-disk inode structure containing, e.g., access control list (ACL) information associated with the file or directory.

The contents of data section 350 of each inode 300 may be interpreted differently depending upon the type of file (inode) defined within the type field 312. For example, the data section 350 of a directory inode structure includes meta-data controlled by the file system, whereas the data section of a "regular inode" structure includes user-defined data. In this latter case, the data section 350 includes a representation of the data associated with the file.

Specifically, data section 350 of a regular on-disk inode file may include user data or pointers, the latter referencing, for example, 4 KB data blocks for storing user data at a storage disk. Each pointer is preferably a logical volume block number to facilitate efficiency among file system 202.

Inode structure 300 may have a restricted size (for example, 128 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the inode comprises up to 16 pointers, each of which references a 4 KB block of data stored at a disk. Moreover, if the size of the data is greater than 64 kilobytes but less than or equal to 64 megabytes (MB), then each pointer in the data section 350 of the inode references an indirect inode that contains 1024 pointers, each of which references a 4 KB data block on disk.

Figure 4:
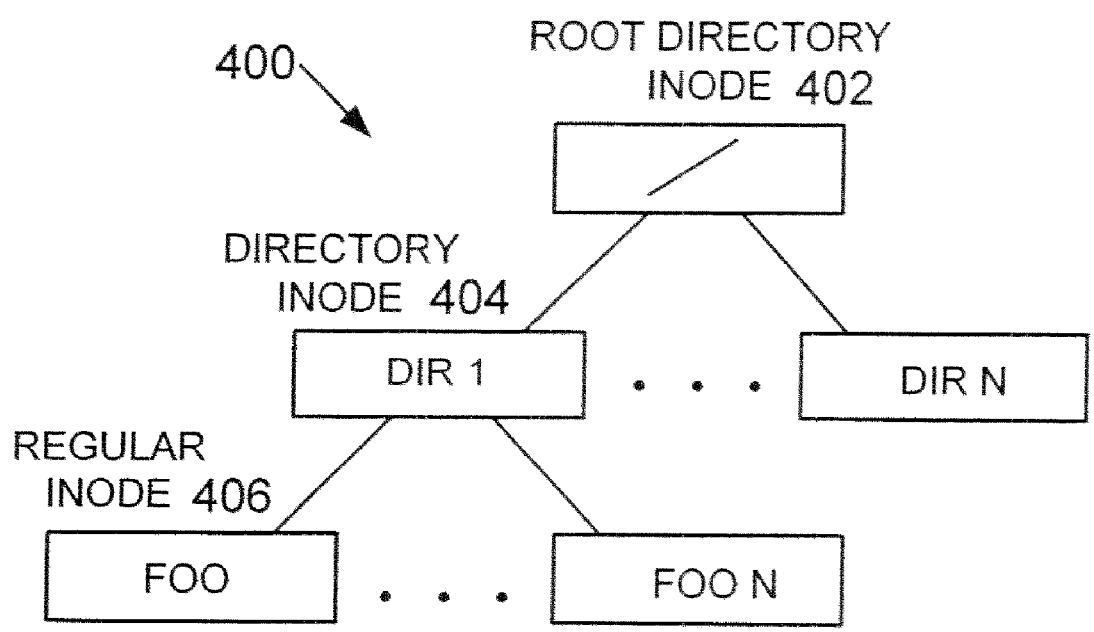
FIG. 4 shows a hierarchical inode structure used according to one embodiment of the present disclosure.

FIG. 4 is a schematic block diagram illustrating a hierarchical on-disk inode structure 400 used by file system 202. Specifically, the WAFL layer of file system manager 202 parses the first (/) preceding a pathname and maps it to a root inode structure 402 of its file system. The root inode 402 is a directory with a plurality of entries, each of which stores a name of a directory and its corresponding mapping file handle. Operating system 200 can convert that handle to a disk block and, thus, retrieve a block (inode) from disk.

Broadly stated, a name is an external representation of an inode data structure, i.e., a representation of the inode as viewed external to the file system. In contrast, the file handle is an internal representation of the data structure, i.e., a representation of the inode data structure that is used internally within the file system. The file handle generally consists of a plurality of components including a file ID (inode number), a snap-shot ID, a generation ID and a flag. The file handle is exchanged among the client 110 and server (storage server 120) over the network 140 to enable storage server 120 to efficiently retrieve a corresponding file or directory. That is, the file system manager 202 may efficiently access a file or directory by mapping its inode number to a block on disk 130 using the inode file.

Accordingly, the WAFL layer loads a root directory inode 402 from disk 130 into memory 124, such that the root inode is represented as an incore inode, and loads any data blocks referenced by the incore root inode. The WAFL layer then searches the contents of the root inode data blocks for a directory name, for example, "DIR1". If the DIR1 directory name is found in those data blocks, the WAFL layer uses the corresponding file handle to retrieve the DIR1 directory inode 404 from disk and loads it (and its data blocks) into memory as an incore inode structure(s). As with the root inode, the directory inode has a plurality of entries; here, however, each entry stores a name of a regular file and its corresponding mapping file handle.

The WAFL layer searches the entries of the DIR1 directory inode data blocks to determine whether a regular inode file name, for example, "foo" exists and, if so, obtains its corresponding file handle (inode number) and loads the regular inode 406 from disk. The WAFL layer then returns the file handle for the file name "foo" to protocol layer (for example, CIFS layer) 204 of the operating system 200.

As described above, file system manager 202 may use a tree structure starting from a root inode. To take a snapshot, the file system manager 202 creates a duplicate root inode 402. Any file or metadata updates after that go to new blocks rather than overwriting the existing blocks. The new root inode belonging to an active file system points to metadata and data changed after the modification. Meanwhile, the old root inode (belonging to the snapshot) still points to the old blocks (i.e. the inactive blocks), which may not be updated. The inactive blocks provide access to the file system just as it was at the instant the snapshot was made. The inactive snapshot blocks are typically only used by snapshots and are not typically used by the active file system.

Inactive blocks occupy storage space. In some environments, for example, code development environment, programmers may frequently update stored data, which increases the number of inactive blocks. Managing and storing these inactive blocks is a challenge faced by conventional file systems. The adaptive embodiments disclosed herein solve this problem by compressing inactive snapshot blocks.

Figure 5:
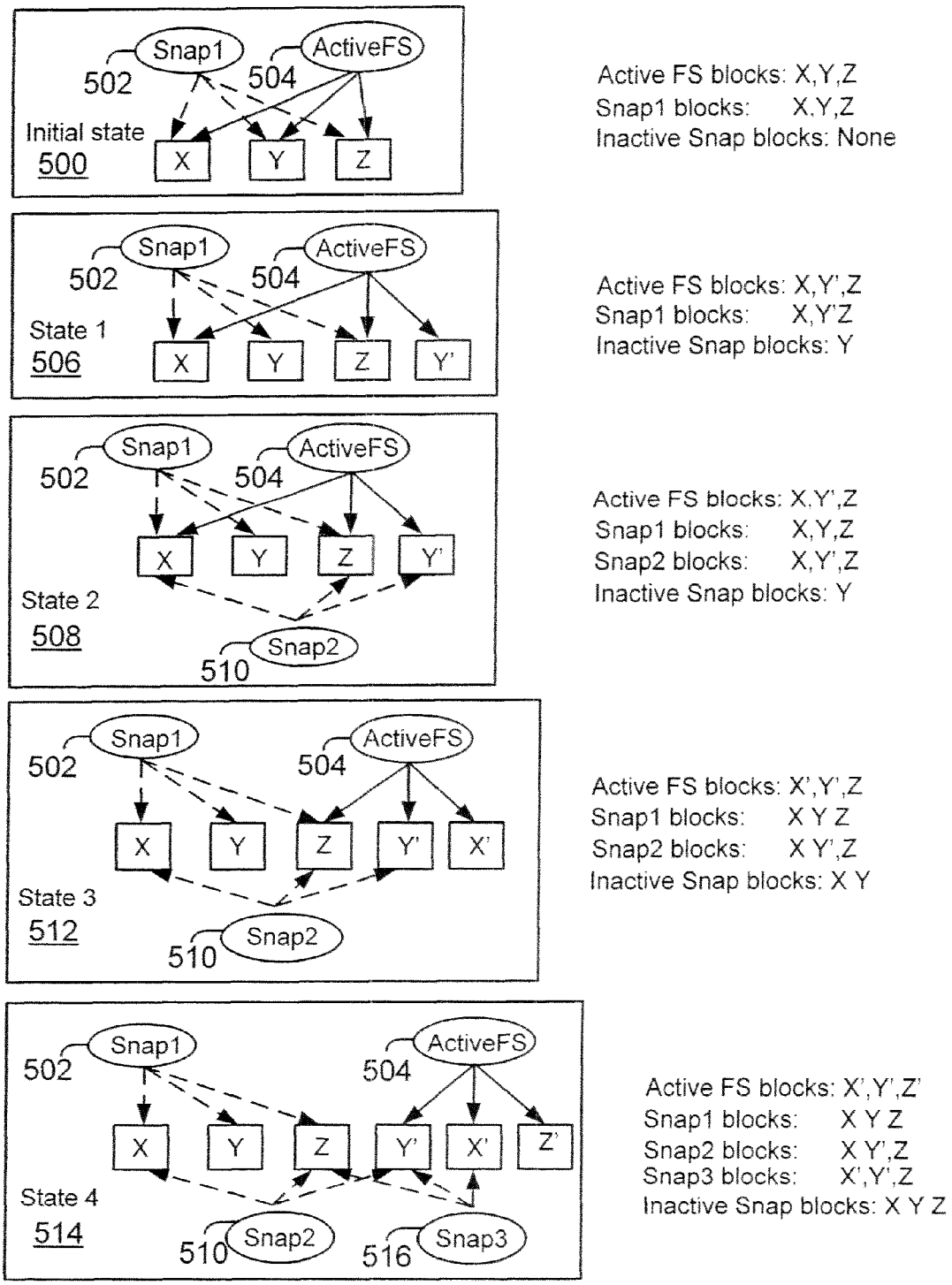
FIG. 5 shows an example of how data blocks may become inactive.

Inactive Blocks:

FIG. 5 shows a block diagram with an example of how snapshot blocks may become inactive. At an initial state 500, a user takes a first snapshot (shown as Snap1 502). At this instance, both the active file system (shown as ActiveFS 504) and Snap1 502 point to blocks X, Y, and Z.

In state 1, 506, a user modifies data block Y. The file system writes the new data as a new block (shown as Y') and updates the active file system 504 to point to the new block Y', while Snap1 502, still points to the original block Y. Hence, the original block Y, becomes an inactive block.

In state 2, 508, a user takes another snapshot, shown as Snap2, 510. In state 2 (508), both ActiveFS 504 and Snap2 510 point to X, Y', Z, while Snap1 502 still points to X, Y and Z blocks.

In state 3 512, a user modifies data block X. The file system writes the modified data to a new block, X', and updates the ActiveFS 504 to point to X', while snap2 510 still points to X. Hence, in state 3, both blocks X and Y become inactive blocks.

In state 4 514, a user takes another snapshot, shown as Snap3, 516 that points to X', Y' and Z. After the snapshot is taken, block Z is modified. The file system writes the modified block Z to a new block, shown as Z' and updates the ActiveFS 504 to point to the modified block Z'. However, Snap3 516 still points to the original block 7. Hence, in state 4, original blocks X, Y and Z become inactive snapshot blocks.

The foregoing example is used only to show how certain blocks become inactive. The adaptive embodiments disclosed herein are not limited to any particular number of states and number of inactive blocks.

The inactive snapshot blocks are typically used, when a user wants to restore the file system based on a particular snapshot. However, the inactive blocks still consume storage space. In one embodiment, the inactive snapshot blocks are compressed. A mapping structure, as described below, is maintained that allows one to easily decompress the compressed blocks, when needed.

Figure 6A:
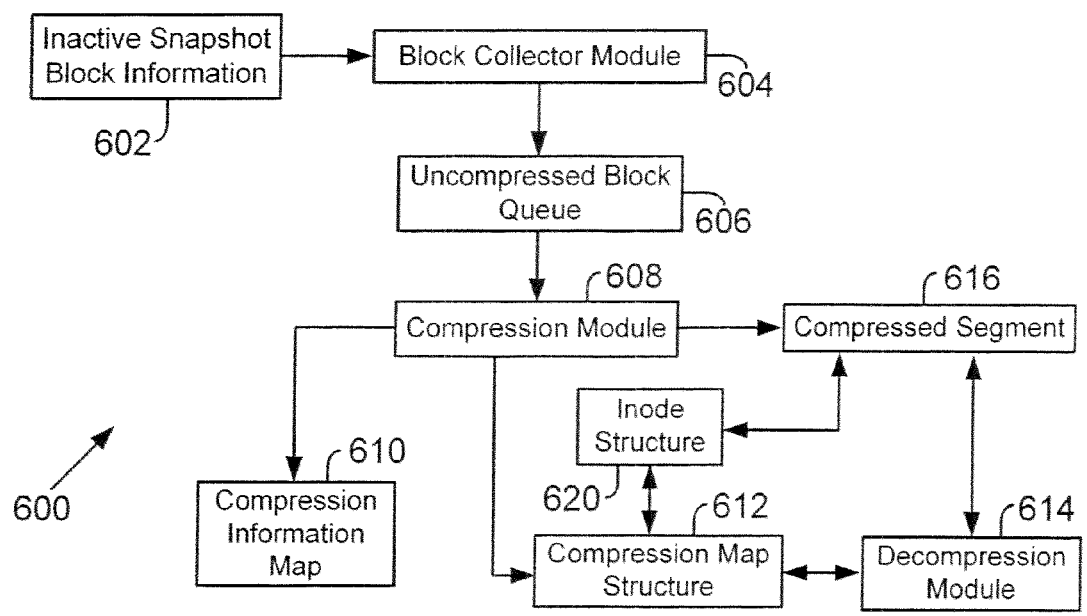
FIG. 6A shows a system for managing inactive blocks, according to one embodiment.

Inactive Block Management System:

FIG. 6A shows a block diagram of a system 600 for managing inactive snapshot blocks, according to one embodiment. In one embodiment, System 600 may be implemented by the operating system 100, for example, in file system manager 202 (See FIG. 2). System 600 includes a block collector module 604 that accesses uncompressed inactive snapshot block information 602. The snapshot information may include address information for uncompressed inactive snapshot blocks and the name of the snapshot file that points to the uncompressed inactive blocks. Block collector module 604 obtains the inactive snapshot block information 602 from reading metadata from the snapshot inode files.

Block collector module 604 takes the inactive snapshot block information 602 and moves it to an uncompressed inactive block queue 606. Uncompressed block queue 606 may store the inactive snapshot block information 602 in a first in-first out (FIFO) memory structure. When the number of entries for the inactive snapshot blocks exceeds or equals a threshold value, compression module 608 compresses the inactive snapshot blocks into a segment. The threshold value may be programmed.

The compressed blocks are shown as compressed segment 616. After compressing the inactive blocks, compression module 608 updates a compression map structure (may also be referred to as global compression map structure) 612 and a compression information map 610.

The global compression map structure 612 includes details of a plurality of compressed segments and is global in nature, i.e. it includes information regarding all the stored compressed segments 616 managed by the file system. Information stored in the global compression map structure 612 is used by decompression module 614 to decompress the compressed blocks, as described below. Snapshot inode structure 620 points to the compression information map structure 610 and also points to the compressed segment 616. FIG. 6B shows an example of the global compression map structure 612 and is described below.

Compression information map 610 stores information for each block included in the compressed segment 616. Compression information map 610 stores a code that identifies the compression state for each block within the compressed segment. In one example, the compression state may be stored as a two bit value. FIG. 62 shows an example of compression information map 610 and is described below.

Referring now to FIG. 6B, the global compression map structure 612 may include a plurality of columns. For example, column 622 that includes a starting physical address of a compressed segment; column 624 that includes the pre-compression segment size; column 626 that includes the post compression segment size; and column 628 that includes the pre-compression size of each individual block. Column 630 includes information of each snapshot inode file within a particular compressed segment; and column 632 includes information regarding a compression algorithm (including the compression ratio used to compress the blocks) that was used to compress the segment (for example, Huffman coding, LZW and others).

The layout of the global compression map structure 612 in FIG. 6B is only being used to illustrate one way to store the compression related information. The layout is not to be viewed in a limiting sense. Furthermore, the adaptive embodiments are not limited to any particular compression/de-compression technique.

Figures 6C, 6D:
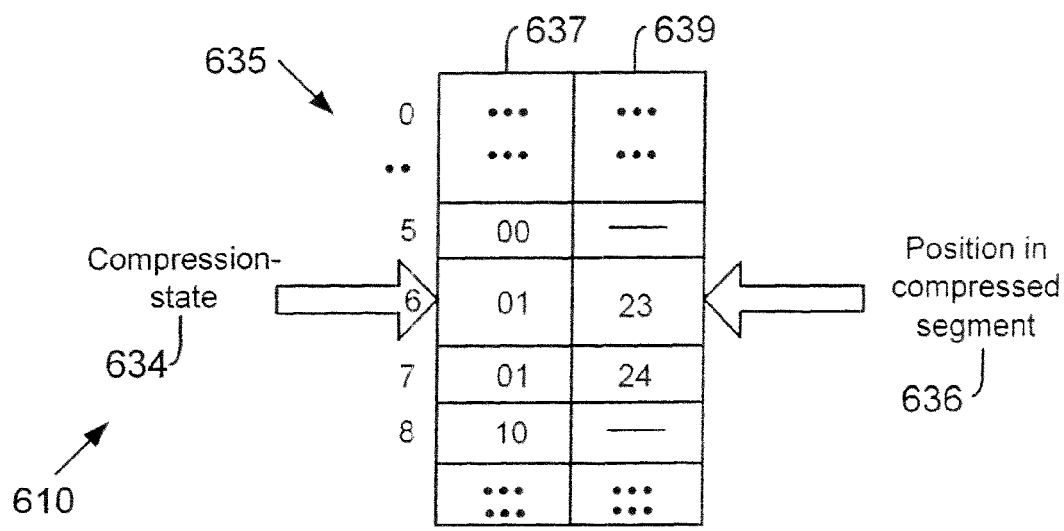
FIG. 6C shows an example of a compression information map, according to one embodiment.
FIG. 6D shows an example of a table describing block compression states, according to one embodiment.

Referring now to the FIG. 6C example of compression information map 610. Compression information map 610 includes a first column 635 that includes an index value from 0 to N; a second column 637 that stores compression state information (634) for a particular block and a third column 639 stores a location of the block within the compressed segment (shown as 23 and 24 (636)). The compression state 634 indicates whether the block is compressed, uncompressed or cannot be compressed. Compressed segment location 636 allows one to easily access a compressed block within a compressed segment.

FIG. 6D shows an example of compression state information 634. Compression state is shown in column 638 with bit values 00, 01 and 10 and the associated states are shown in column 640. For example, state 00 indicates an uncompressed block; state 01 indicates a compressed block and state 10 indicates a block that cannot be compressed.

Figure 6E:
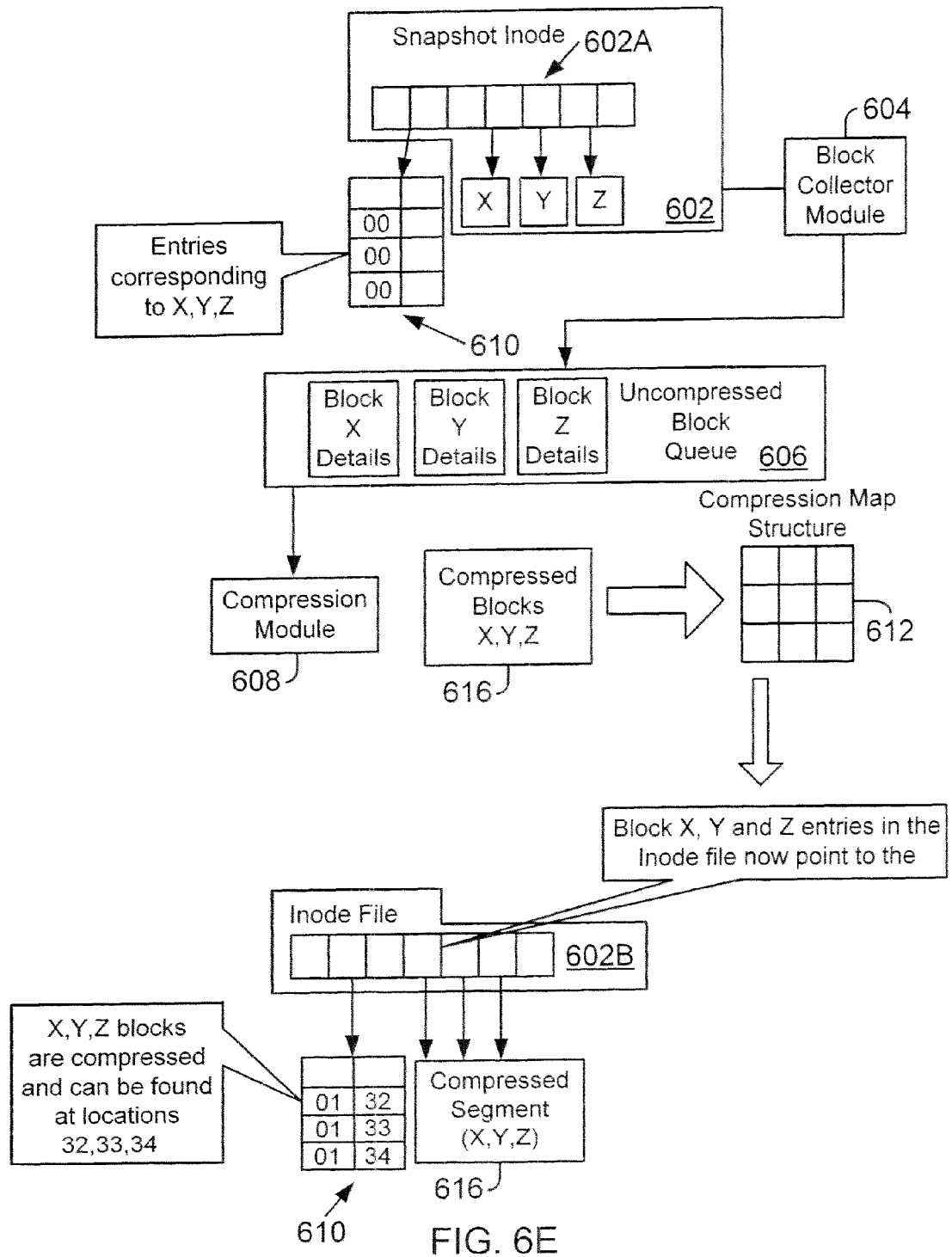
FIG. 6E shows an example of using the system of FIG. 6A, according to one embodiment.

FIG. 6E shows an example of handling inactive snapshot blocks using system 600, according to one embodiment. Inactive snapshot block information 602 is shown with respect to an inode file 602A pointing to blocks X, Y and Z. The associated compression information map 610 shows that all the three blocks (X, Y and 2) are uncompressed because the bit value in column 638 is all equal to zero.

Block collector module 604 collects the inactive block details and places them in queue 606. Uncompressed block queue 606 includes information regarding blocks X, Y and Z.

After the uncompressed block queue has reached a threshold number (for example, 3 in the FIG. 6E examples, compression module 608 takes the uncompressed inactive block information and compresses the inactive blocks. The compressed blocks are stored as a compressed segment 616.

Compression module 608 updates the global compression map structure 612 and thereafter, blocks X, Y and Z entries in the snapshot inode file (602B (similar to inode structure 620, FIG. 6A) point to the compressed segment 616. The compression information map 610 is also updated and indicates that blocks X, Y, and Z are compressed (bit value of 01). The location of the compressed blocks within compressed segment 616 is shown as 32, 33 and 34.

Figure 6F:
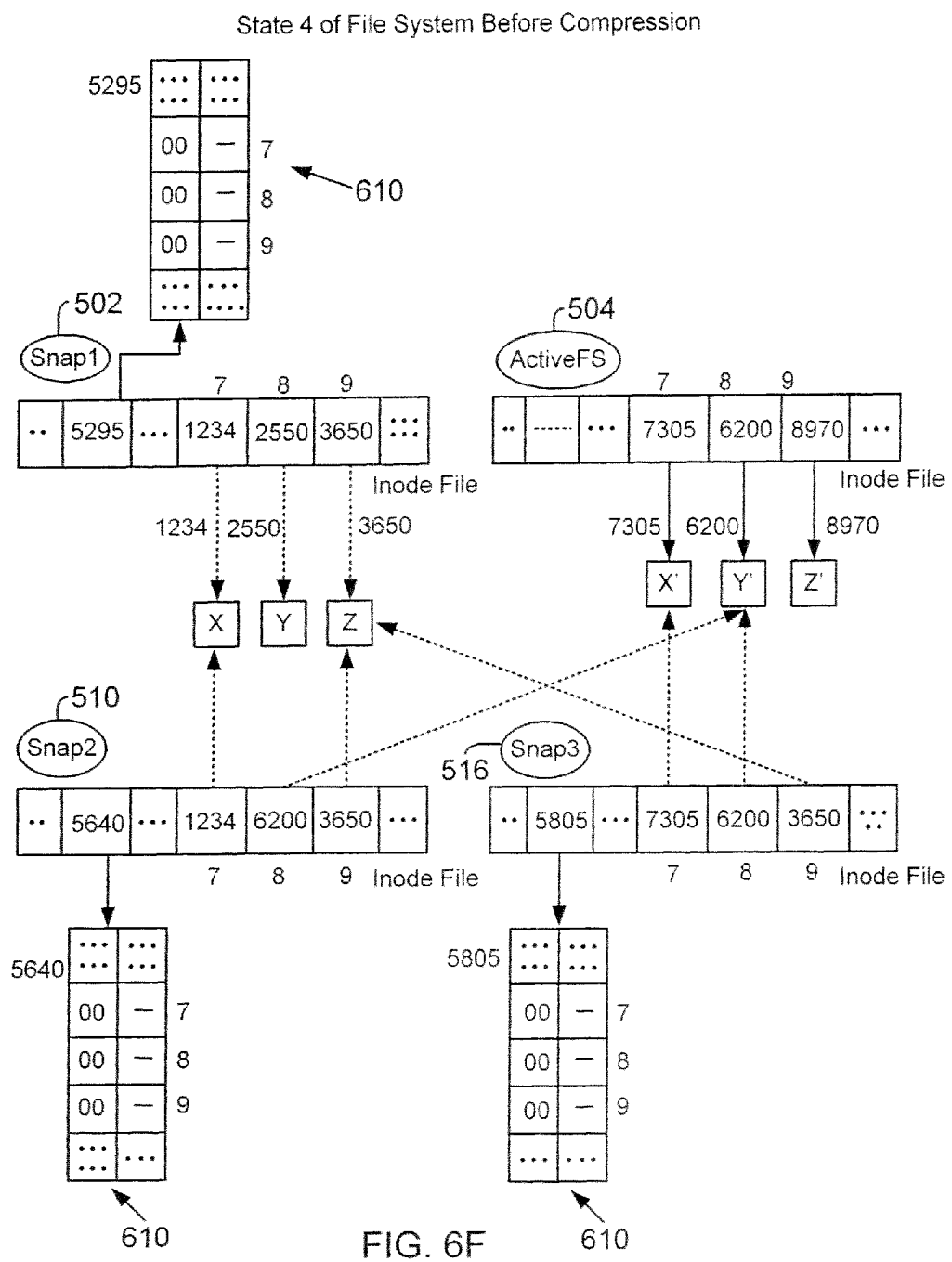
FIG. 6F shows an example of a file system state before compression.

FIG. 6F shows an example of the file system in state 4 (514) (See FIG. 5) with metadata details without compression. For snapshot1 (502), the compression information map 610 indicates that all the blocks are uncompressed. Each inode snapshot file includes a field that points to compression information map 610. For example, in Snap1 502, the field has a value of 5295, for Snap2 510 inode file, the field has a value of 5640 and for Snap3 516 inode file, the field has a value of 5805.

In state 4, ActiveFS inode file 504 points to modified blocks X' (address 7305), Y' (6200) and Z' (8970). Snap1 502 points to block X (1234), Y (2550) and Z (3650). Snap2 510 points to blocks X (1234), Y' (6200) and Z (3650). Snap3 516 points to block X' (7305) Y' (6200) and Z (3650). Therefore, in state 4 514, the active file system (Active FS 504) points to modified blocks and the original blocks (X, Y and Z) become inactive.

Figure 6G:
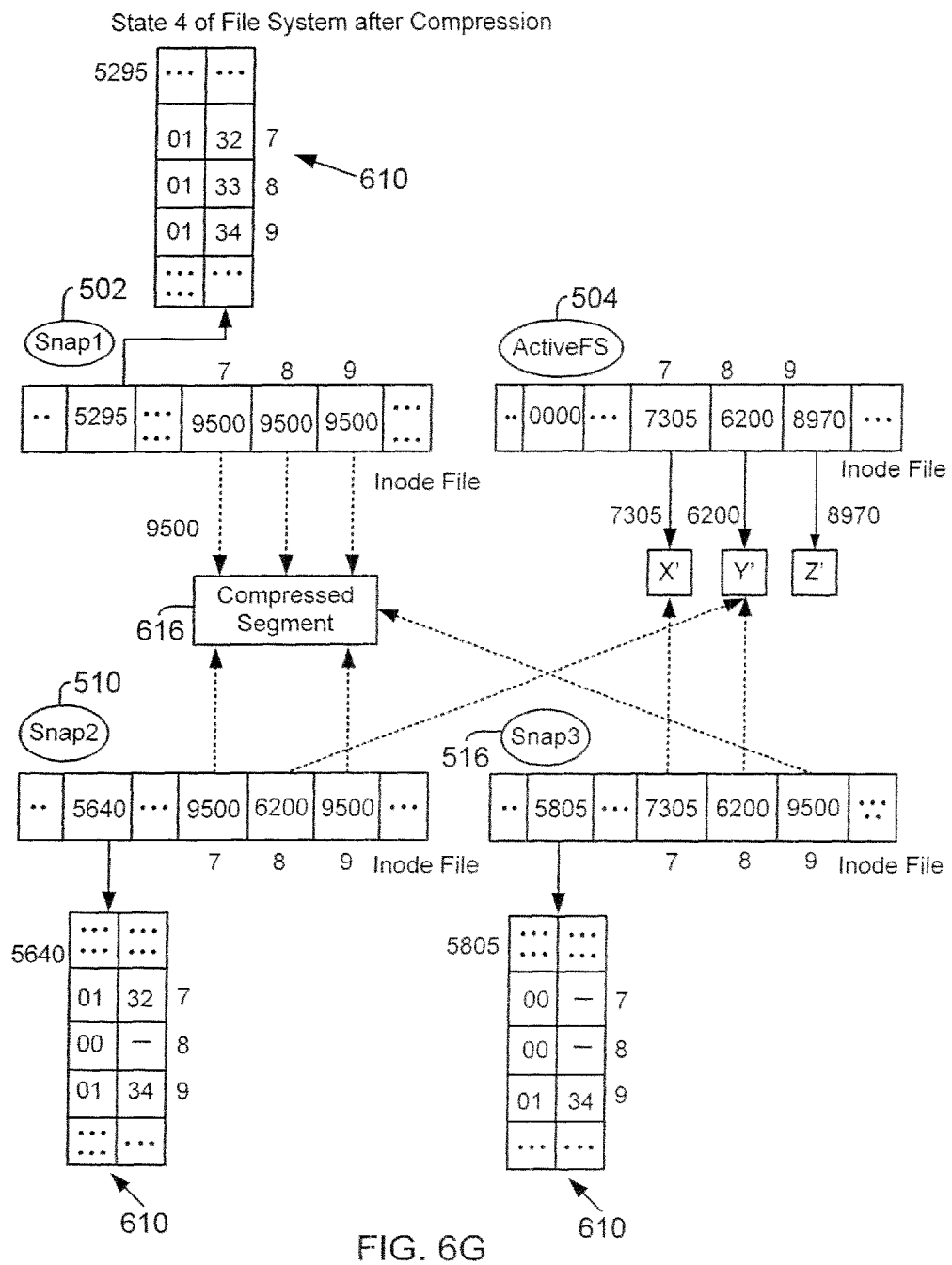
FIG. 6G shows an example of a file system state after compression, according to one embodiment.

FIG. 6G shows state 4 514 of the file system after compression, according to one embodiment. Snapshot inode files all point to compressed segment 616 (shown by address 9500). Snap1 502 points to compression map 610 that shows all inactive blocks, X, Y and Z are compressed. Snap2 510 points to compressed segment 616 for blocks X and Z and to Y' (6200). Snap2 510 inode file also points to compression information map 610 showing that only blocks X and Z are compressed and are located at location 32 and 34 of the compressed segment 616.

Snap3 inode file 516 points to compressed segment 616 for block Z and to blocks X' (7305) and Y' (6200) (the active blocks used by the file system). Snap3 inode file 516 points to compression information map 610 showing that only block Z is compressed for this inode file and is located at location 34.

As shown in FIG. 6G, the compressed segment 616 stores all inactive blocks that are made available to different snapshot inode files. The inactive blocks can easily be accessed when the system is restored using a particular snapshot inode file.

Decompression:

Referring back to FIG. 6A when a snapshot file needs to be restored, the compressed inactive snapshot blocks are decompressed by decompression module 614. Decompression module reads the compression map structure 612 to obtain compression related information, for example, compression algorithm, compression ratio or any other information that may be used to decompress an inactive block. Decompression module 614 obtains the compressed blocks from compressed segment 614 and decompresses the inactive blocks based on the type of compression algorithm that was used to compress the inactive blocks.

Figure 7:
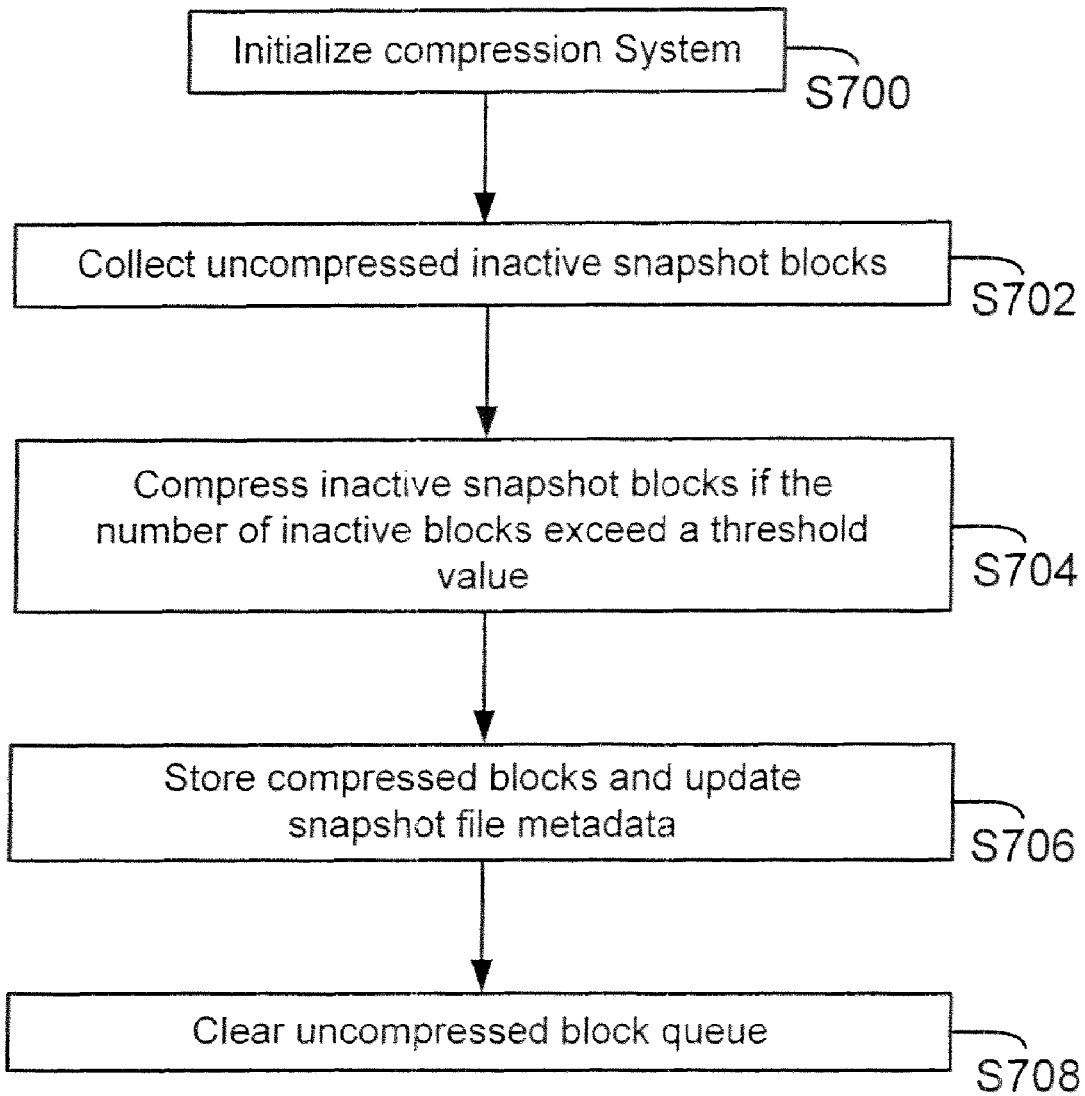
FIG. 7 shows a process flow diagram for managing inactive blocks, according to one embodiment.

Process Flow Diagram:

FIG. 7 shows a process flow diagram for processing inactive snapshot blocks, according to one embodiment. The process starts in step S700, when the compression system (for example, system 600, FIG. 6A) is initialized. In step S701, uncompressed inactive block information is collected and placed in a queue (for example, blocks X, Y and Z information placed in uncompressed block queue 606, FIG. 6E).

In step S704, if the number of inactive blocks from one or more snapshots exceeds or equals a threshold value, then the inactive blocks are compressed. A user may specify the threshold value, which is programmable. The compression technique for compressing the segment may also be specified. Any compression technique, for example, Huffman, LZW or any other technique may be used to compress the inactive blocks. The adaptive embodiments are not restricted to any particular standard or proprietary compression technique.

After the blocks are compressed, inode structure 620, global compression map structure 612 and compression information map 610 are updated. The compression map structure 612 is updated to include the starting physical address of the compressed segment, pre-compression and post compression size of the blocks, compression algorithm information and identifier information identifying the snapshot files that point to the compressed inactive snapshot files. The compression information map 610 is updated to include the location of the compressed blocks within the compressed segment and an identifier identifying the compressed state of the compressed blocks. An example of the updates is shown in FIG. 6G and is described above.

In step S708, the uncompressed block queue 606 is cleared.

In one embodiment, the foregoing system and techniques save overall storage space by compressing inactive blocks. The savings occur without any impact to user experience because although the inactive blocks are compressed, the active blocks remain uncompressed. The following example illustrates the space savings by compressing the inactive blocks: (a) Assume that there are 100 files with a total of 10000 blocks in, for example, a concurrent versioning system (CVS), used for developing computer code. (b) Assume that 5% of these blocks are modified and an Administrator takes snapshots every day and saves the last 50 snapshots. The WAFL Layer allocates 0.05*10000=200 new data blocks due to the modifications, and updates the active file system to point to the new 200 blocks. The old 200 blocks are retained and are only used by the snapshots. Hence, the total number of blocks used by these files (active and snapshot), without compression are:

$$= 10000 \text{ (active } FS) + 200 * 50 \text{ (snapshots)}$$
$$= 10000 + 10000$$
$$= 20000 \text{ blocks}$$

Assume that the compression ratio is 30% (i.e. 70% savings compared to uncompressed size) for compressing the inactive blocks. If inactive blocks are compressed, then the total number of blocks used by these files is:

$$= 10000 \text{ (active } FS) + 200 * 50 * 0.3 (30\% \text{ compensation ratio})$$
$$= 10000 + 3000$$
$$= 13000 \text{ blocks}$$

$$\text{Total savings} = (20000 - 13000)/20000 = 35\%$$

Hence, the foregoing techniques save 35% of the total storage space.

In one embodiment, since the overall storage space is saved, one can use the saved storage space to store more file data.

In another embodiment, since inactive blocks are compressed and more storage space becomes available, a user may take more snapshots. This is especially useful in an environment where the rate at which snapshots are taken is high. An example of such an environment is a computer code development system that uses a concurrent versioning system for managing development of computer code. The foregoing techniques and system are also useful for data storage backup and testing environments, where snapshots are frequently taken.

In yet another embodiment, the aforementioned techniques and system provide flexibility in handling inactive blocks. For example, one can use different compression/de-compression techniques and compression ratios to compress inactive snapshot blocks. Accessibility to compression information is also easy because all one has to do is access the compression map structure to obtain that information.

In another embodiment, since only inactive blocks are compressed the active file system is not impacted in any way. Therefore, there is no negative impact on the performance of the active file system.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method for processing a plurality of uncompressed inactive snapshot blocks in a storage system, comprising:
    collecting information related to the plurality of uncompressed inactive snapshot blocks; wherein an inactive snapshot block is a block that is referenced by a snapshot, but is not actively referenced by a processor executable active file system of the storage system;
    storing the collected information in a queue;
    compressing the plurality of uncompressed inactive snapshot blocks when a number of the plurality of uncompressed inactive snapshot blocks reaches a programmable threshold value;
    storing the compressed inactive snapshot blocks as a compressed segment;
    updating a compression map structure with information regarding the compressed segment; wherein the compression map structure stores information regarding all the compressed segments maintained by the storage system and is used to locate the compressed inactive snapshot blocks and then de-compress the compressed inactive snapshot blocks based on the information stored by the compression map structure including information regarding a compression process used to compress the plurality of uncompressed inactive snapshot blocks, a pre-compressed segment size of the compressed segment and a post compression size of the compressed segment; and wherein the compression map structure stores a physical address of the compressed segment and includes a snapshot identifier for identifying a snapshot whose blocks are compressed within the compressed segment; and
    updating a compression information map structure for indicating that the plurality of uncompressed inactive snapshot blocks are compressed and providing a location of each inactive snapshot block within the compressed segment.

2. The method of claim 1, wherein each snapshot file having at least one inactive block is associated with the compression information map with information regarding a state of the at least one inactive block and the compression information map is updated after the inactive block is compressed.

3. The method of claim 2, wherein the compression information map includes a value for identifying a position of the at least one inactive block in the compressed segment.

4. The method of claim 1, wherein the compressed segment includes a plurality of compressed inactive blocks for a plurality of snapshot files.

5. A system for processing a plurality of uncompressed inactive snapshot blocks in a storage system, comprising:
    a processor; and
    a memory, wherein the memory is configured with modules stored thereon, the modules comprising:
    a processor executable block collector module for collecting information related to the plurality of uncompressed inactive snapshot blocks and storing the collected information in a queue; wherein an inactive snapshot block is a block that is referenced by a snapshot but is not actively referenced by a processor executable active file system of the storage system; and
    a processor executable compression module for compressing the plurality of uncompressed inactive snapshot blocks when a number of the plurality of uncompressed inactive snapshot blocks reaches a programmable threshold value; storing the compressed inactive snapshot blocks as a compressed segment; updating a compression map structure with information regarding the compressed segment; wherein the compression map structure stores information regarding all the compressed segments maintained by the storage system and is used to locate the compressed inactive snapshot blocks and de-compress the compressed inactive snapshot blocks based on the information stored by the compression map structure including information regarding a compression process used to compress the plurality of uncompressed inactive snapshot blocks, a pre-compressed segment size of the compressed segment and a post compression size of the compressed segment; and wherein the compression map structure stores a physical address of the compressed segment and includes a snapshot identifier for identifying a snapshot whose blocks are compressed within the compressed segment; and updating a compression information map structure for indicating that the plurality of uncompressed inactive snapshot blocks are compressed and providing a location of each inactive snapshot block within the compressed segment.

6. The system of claim 5, wherein each snapshot file having at least one inactive block is associated with the compression information map, the compression information map including information regarding a state of the at least one inactive block and a value indicating a position of the at least one inactive block in a compressed segment, the compression information map being updated after an inactive block is compressed.

7. The system of claim 5, wherein a decompression module decompresses the compressed segment by using information from the compression map structure.

8. The system of claim 5, wherein the compressed segment includes a plurality of compressed inactive blocks for a plurality of snapshot files.

9. A method for processing a plurality of uncompressed inactive snapshot blocks in a storage system, comprising:
    compressing the plurality of uncompressed inactive snapshot blocks when a number of the plurality of uncompressed inactive snapshot blocks reaches a programmable threshold value, without compressing any active blocks; wherein an inactive snapshot block is a block that is referenced by a snapshot but is not actively referenced by a processor executable active file system of the storage system;
    storing the compressed inactive snapshot blocks as a compressed segment; and
    updating a compression map structure that stores information regarding all the compressed segments maintained by the storage system with information regarding the compressed segment; wherein the compression map structure stores information regarding a compression process used to compress the plurality of uncompressed inactive snapshot blocks, a pre-compressed segment size of the compressed segment and a post compression size of the compressed segment and is used to decompress the compressed inactive snapshot blocks; and wherein the compression map structure stores a physical address of the compressed segment and includes a snapshot identifier for identifying a snapshot whose blocks are compressed within the compressed segment; and
    updating a compression information map structure for indicating that the plurality of uncompressed inactive snapshot blocks are compressed and providing a location of each inactive snapshot block within the compressed segment.

10. The method of claim 9, further comprising:
    prior to compressing the inactive snapshot blocks, collecting information related to the plurality of uncompressed inactive snapshot blocks; and storing the collected information in a queue.

11. The method of claim 9, wherein the compression information is used by a decompression module to decompress the inactive snapshot blocks.

12. The method of claim 9, wherein each snapshot file having at least one inactive block is associated with the compression information map with information regarding a state of the at least one inactive block and the compression information map is updated after an inactive block is compressed.

13. The method of claim 12, wherein the compression information map includes a value identifying a position of the at least one inactive block in a compressed segment.

14. The method of claim 9, wherein the compressed segment includes a plurality of compressed inactive blocks for a plurality of snapshot files.

* * * * *